Patented Oct. 26, 1937

2,097,348

UNITED STATES PATENT OFFICE 2,097,348

SYNTHETIC RESINS

Joseph Harrel Shipp, Wilmington, Del., assignor to E. I. du Pont de Nemours & Company, Wilmington, Del., a corporation of Delaware No Drawing. Application January 7, 1936, Serial No. 58,021

2 Claims. (Cl. 260—2)

This invention relates to synthetic resins, and more particularly it relates to resins obtained by polymerizing aryl carbinols.

In the methods previously used for polymerizing the aryl carbinol, benzyl alcohol, as well as the aralkyl carbinols such as cinnamyl alcohol, the carbinol has been heated in the presence of from about ⅕ mol. to 1 mol. sulfuric acid, the acid being preferably added at a concentration of about 75%. For each 100 grams of benzyl alcohol the amount of acid used would be from about 18 grams to about 90 grams. The maximum temperature for the condensation reaction is about 130° C. which is raised to about 180° C. after the resin has been formed. This method has several disadvantages. The tendency of the aryl carbinols to char and darken under the above treatment prevents the use of high temperatures, and hence prevents the production of light colored resins of satisfactory water and alkali resistance. It results in the formation of undesirable by-products, such as sulfonic acids and other sulfonated products. In addition to decreasing the yield these by-products cause darkening of the resin and increase its water sensitivity. The process is uneconomical because of the large amount of acid used, and because of the extensive washing of the resin which is required, together with the treating required with alkali substances, centrifuging, etc. to remove the acid condensing agent. Moreover, the polymerized products are not very soluble and hence cannot be blended homogeneously with drying oils, oil modified polyhydric alcohol-polybasic acid resins, etc.

This invention has as an object an improved method for polymerizing aryl carbinols. A further object is the preparation from aryl carbinols of resins which are useful in coating compositions. A further object is the preparation from aryl carbinols of resins which blend homogeneously with drying oils, oil modified polyhydric alcohol-polycarboxylic acid resins, cellulose derivatives, etc., and which when blended therewith give coatings which are useful as protective finishes for various kinds of surfaces. A further object is the preparation of resins from aryl carbinols by a process which is more economical than processes disclosed in the prior art, and which produces more highly polymerized and lighter colored resins. A still further object is the production of new and useful polymerized aryl carbinols.

The above and other objects appearing hereinafter are accomplished by first polymerizing the aryl carbinol by heating in the presence of 0.1% to 5.0% of a strong non-volatile mineral acid, such as sulfuric acid, calculated on the basis of the absolute or 100% acid, until the desired degree of polymerization occurs, purifying the resulting resinous product, and then, if desired, combining it with a drying oil, other resins, or cellulose derivatives.

The resins of this invention are polymerization products of aryl carbinols and are obtained by treatment thereof with catalytic proportions of a strong, non-volatile mineral acid such as sulfuric acid. In the preferred practice of the invention, the aryl carbinol is heated with comparatively dilute acid in amount to give the required quantity of acid based upon the amount of carbinol as mentioned above. The best results are obtained with about 1% of its weight of 33% aqueous sulfuric acid. After polymerization is complete the resin is isolated and purified. The resins produced according to this invention are generally soluble in drying oils, oil modified polyhydric alcohol-polycarboxylic acid resins, and are compatible with cellulose derivatives and waxes.

A suitable apparatus in which to synthesize the resins described herein consists of a vessel fitted with a thermometer, a reflux condenser, and a stirrer designed to sweep the sides and bottom of the vessel.

The following examples are submitted to illustrate but not to limit the invention:

Example I

A mixture consisting of 50 grams of para-methylphenyl carbinol (para-tolyl carbinol) and 0.5 gram of 33% aqueous sulfuric acid (0.33% of the absolute acid based on the para-methylphenyl carbinol) was placed in a 200 cc. flask fitted with a thermometer, stirrer, and short air-cooled condenser, and the mixture was heated for two hours at 100° C., then heated up to 200° C., where it was held until a hard resin formed upon cooling. The resin was separated, extracted with boiling alcohol, the alcohol separated, and the resin dried for five hours in a vacuum oven at 100° C. A light, amber-colored resin soluble in toluene, butyl acetate, and compatible with China-wood oil, linseed oil, and waxes, was obtained. Films of this resin were relatively unaffected by prolonged contact with water.

Example II

To 100 grams of benzyl alcohol in a suitable reaction vessel was added approximately one gram of a 33% aqueous solution of sulfuric acid (0.33% of the absolute acid). The mixture was heated with stirring to approximately 200° C. A violent exothermic reaction occurred during this time during which water was eliminated. The water formed was allowed to distill off during the reaction. After the reaction subsided, the mixture was cooled, the resulting resin was washed by kneading with hot water, and was then dried in air. The product was a light brown, thermoplastic, fluorescent resin, which was brittle when cold. It softened to a plastic mass in boiling water and melted at higher temperatures. It was soluble in aromatic hydrocarbons, in esters, and in benzyl alcohol, but was insoluble in aliphatic hydrocarbons, acetone, or ethyl alcohol. Its solution in toluene had a blue fluorescence and deposited a clear, continuous film upon drying. This resin was incompatible with cold China-wood oil, but dissolved in hot China-wood oil.

Example III

To 100 grams of benzyl alcohol in a suitable reaction vessel was added approximately 1 gram of 85% orthophosphoric acid and 1 gram of phosphorus pentoxide. Since the latter substance is orthophosphoric acid anhydride the total amount of the acid based upon the benzyl alcohol is 2.13%. The mixture was refluxed at approximately 200° C. until a violent exothermic reaction began, when heating was discontinued. When the exothermic reaction subsided, the reaction mixture was cooled. A soft, balsam-like, almost water-white resin was obtained which blended with linseed oil to produce a fluorescent, homogeneous film.

Example IV

Example III was repeated except that 1% of phosphorus pentoxide was used as the condensing agent and that the heating was continued until a hard, tough, light yellow resin was obtained.

The polymerized alkyl-substituted aryl carbinols are more oil-soluble than the polymerized unsubstituted aryl carbinols. This is particularly true of the resins prepared with sulfuric acid as the condensing agent.

I may use an aryl carbinol of the general formula $RCH_2(OH)$ where R is an aromatic radical, e. g., phenyl, tolyl, xylyl, mesityl, p-phenylphenyl, etc. It is to be understood that I mean by aryl carbinol an aromatic non-phenolic alcohol in which the aromatic nucleus and the alcoholic hydroxyl group are attached to the same carbon atom. The aryl groups may be unsubstituted (except for the carbinol group), or they may be substituted in any of their free positions by alkyl or other groups or elements (except hydroxyl). The aryl groups may be mononuclear such as phenyl, tolyl, etc., or they may be polynuclear (either condensed or non-condensed) such as naphthyl, diphenyl, p-benzylphenylmethyl, etc. Examples of aryl carbinols which are suitable for use in this invention are meta-methylphenyl carbinol, 3,5-dimethylphenyl carbinol, 3,4-dimethylphenyl carbinol, 2,4-dimethylbenzyl alcohol, mesityl alcohol, cumyl alcohol, naphthyl carbinol, para-bi-phenyl carbinol, etc. As previously mentioned, the resins most easily soluble in drying oils are those made from the aryl carbinol containing alkyl groups substituted in the ring. These carbinols include those of the type $R\cdot C\cdot R_1R_2OH$ where R is an alkyl substituted aromatic nucleus and $R_1$ and $R_2$, which are attached to C (carbon), are hydrogen or alkyl groups. The most useful of these carbinols are those of the formula $RCH_2(OH)$ in which R is an alkyl substituted aromatic nucleus as for instance the resins made from p-tolyl carbinol.

In general, I prefer a temperature range of about 100–250° C. in order to facilitate resinification (polymerization) by driving off the water produced during the condensation. The violence of the reaction can be controlled to some extent by varying the temperature and the amount of catalyst used. In some cases, use of inert diluents such as saturated liquid aliphatic hydrocarbons is advantageous as it helps to moderate the reaction and thus avoids troublesome side reactions. Resins varying in their properties from those which are soft and balsam-like to those which are hard and brittle, as well as from those which are oil-soluble to those which are insoluble in known solvents, can be prepared by varying (1) the kind of catalyst, (2) the composition of the polymerizable mixture (i. e., by using different aryl carbinols or mixtures thereof), (3) the time and temperature of reaction. For example, I have prepared heat-hardening resins by polymerizing aryl carbinols such as benzyl alcohol in the presence of about 0.33% of sulfuric acid (based upon the weight of the alcohol) and of phthalic anhydride (the latter in proportions as high as 1:1 molar based upon the alcohol). Furthermore, resins of varying degrees of hardness and solubility may be made by interrupting the polymerization reaction at various stages, or by using different reaction temperatures, or by using different acid condensing agents.

I prefer to use sulfuric acid as the catalyst. Other acid catalysts such as phosphoric acid or phosphoric anhydride (phosphorus pentoxide) may be used but they are less effective as condensing agents than sulfuric acid. The small amounts of sulfuric acid used in the present invention may be added as ordinary or concentrated (95%–98%) acid, but since several important additional advantages follow from the use of the dilute acid, I prefer to use concentrations of from about 30% to 40% and in amounts of about 1% by weight of such concentration based upon the weight of the carbinol.

The resins of this invention find useful application as ingredients in coating compositions, e. g., such as those based on drying oils, oil modified polyhydric alcohol-polycarboxylic acid resins, or cellulose derivatives such as ethyl cellulose, nitrocellulose, cellulose acetate, benzyl cellulose, etc.

A varnish of 25-gallon oil length showing excellent durability upon outside exposure may be made in the usual manner from 34 parts of the resin of Example I, 64 parts of raw China-wood oil, thinner and drier. This varnish when sprayed over wood and steel dries in less than two hours to hard, clear, frost-free, highly lustrous films of good build. A water-resistant lacquer having like advantageous properties may be made from equal parts of the resin and dry ethyl cellulose, a small amount of dibutyl phthalate as softener and suitable solvents.

The products of this invention, and more especially the resins from alkyl substituted aryl carbinols, may be blended with waxes such as paraffin wax, carnauba wax, Japan wax, candelilla wax, ozokerite, etc., and in combination therewith and/or oils, cellulose derivatives, etc., produce coatings which are very useful in the moisture-proofing of paper, cloth, etc.

It is to be understood that in addition to the particular uses exemplified above, the resins of this invention are useful in coating, impregnating, sizing, and molding compositions, adhesives, etc., when combined with one or more of the following: drying, semi-drying, and non-drying oils, cellulose derivatives as for example nitrocellulose, ethyl cellulose, cellulose acetate, benzyl cellulose, etc.; natural and synthetic resins such as rosin, kauri, vinyl resins, phenol-aldehyde resins, acrylic and methacrylic acid ester polymers, etc.; hydrogenated natural and synthetic resins, such as hydrogenated phenol-aldehyde resins, hydrogenated rosin, hydrogenated rosin modified phenol-aldehyde resins, etc.; hydrogenated rosin acid esters such as hydrogenated ester gum, etc. To these compositions may be added pigments, fillers, driers, solvents, etc., as required.

The process described herein, which is applicable only to the aryl carbinols, presents several important advantages over the methods previously used for preparing resins from benzyl alcohol. In the case of benzyl alcohol, the resins produced in accordance with the present invention are capable of being dissolved in drying oil, and in the case of the alkyl-substituted carbinols resins are produced which possess a very marked and easy solubility in drying oil. As compared to the resins made by dehydrating the aryl carbinol at relatively low temperatures with large amounts of sulfuric acid or other desiccating acids, the resins made as described herein at high temperatures in the presence of small amounts of acid with elimination of water by distillation during polymerization are more highly polymerized and are more water-resistant.

The practice of this invention minimizes charring or darkening and therefore permits higher reaction temperatures and hence higher degrees of polymerization, which in turn results in resins having better water and alkali resistance. The use of but small and catalytic amounts of sulfuric acid substantially prevents the formation of the undesirable by-products such as sulfonic acids and of sulfonated products, which reduces the yield of the desired resin and decreases its water-resistance. Then, also, lighter colored resins are produced by my new process because of the absence of large quantities of strong acids which cause discoloration and charring of the reactants and of the resins.

In addition to the superiority of the products referred to above the considerable economy of my process will be apparent. It has heretofore not been known that resins could be prepared from aryl carbinols in the presence of but catalytic quantities of condensing agents. I therefore economize on the acid condensing agent and avoid the necessity of having to recondition it afterwards by reconcentrating. In the present process the amounts of acid used are so small that there is no need to recover the acid.

Although my process is operable with concentrated acid, it being apparent that dilute acid will become concentrated at the high reaction temperatures, the addition of the small amount of acid required in dilute form instead of concentrated presents in itself some valuable advantages. Better distribution throughout the reaction mixture is thereby insured which results in more uniform polymerization and in less violent reaction. The use of dilute acid minimizes the danger of charring or of darkening the reactants or the resins and therefore permits higher polymerization temperatures. As previously mentioned, the higher temperatures facilitate a higher degree of polymerization of the aryl carbinols which in turn results in better water-resistance and hardness.

As many apparently widely different embodiments of this invention may be made without departing from the spirit and scope thereof, it is to be understood that I do not limit myself to the specific embodiments thereof except as defined in the appended claims.

I claim:

1. A process for forming resins from aryl carbinols which comprises adding thereto about 0.1% to about 5% sulfuric acid in the form of a dilute solution of about 30% to 40% concentration, heating at a temperature which removes by distillation the water of reaction, and continuing the heating until a resin is formed.

2. A process for forming resins from aryl carbinols which comprises adding thereto about 1% of approximately 30% sulfuric acid solution, heating at a temperature which removes by distillation the water of reaction, and continuing the heating until a resin is formed.

JOSEPH HARREL SHIPP.